July 10, 1951 — E. J. MEYER — 2,559,727
AIRCRAFT ARMAMENT ASSEMBLY
Filed May 21, 1945 — 3 Sheets-Sheet 1

INVENTOR.
EDWARD J. MEYER
BY George F. Goodyear
ATTORNEY

July 10, 1951  E. J. MEYER  2,559,727
AIRCRAFT ARMAMENT ASSEMBLY
Filed May 21, 1945  3 Sheets-Sheet 2
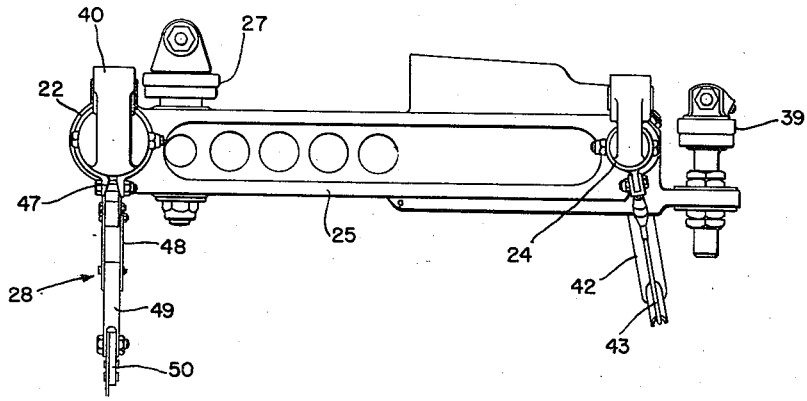
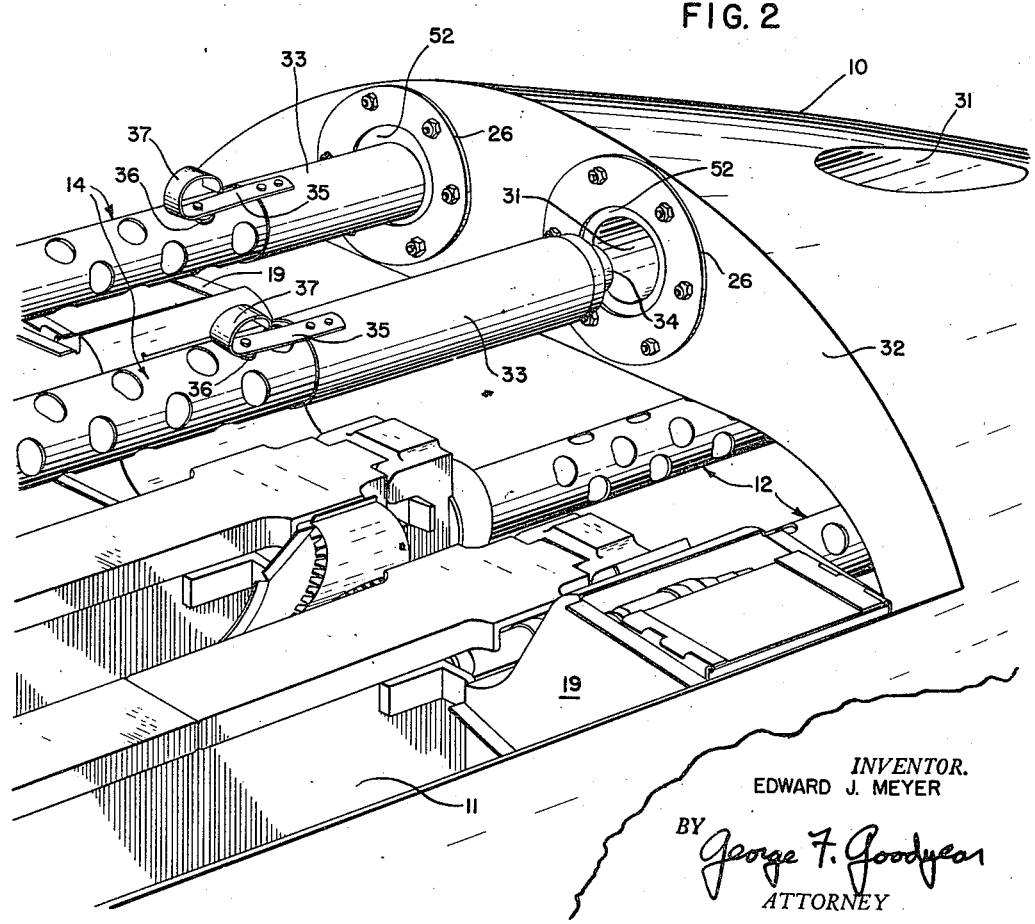
INVENTOR.
EDWARD J. MEYER
BY George F. Goodyear
ATTORNEY July 10, 1951     E. J. MEYER     2,559,727
AIRCRAFT ARMAMENT ASSEMBLY
Filed May 21, 1945     3 Sheets-Sheet 3
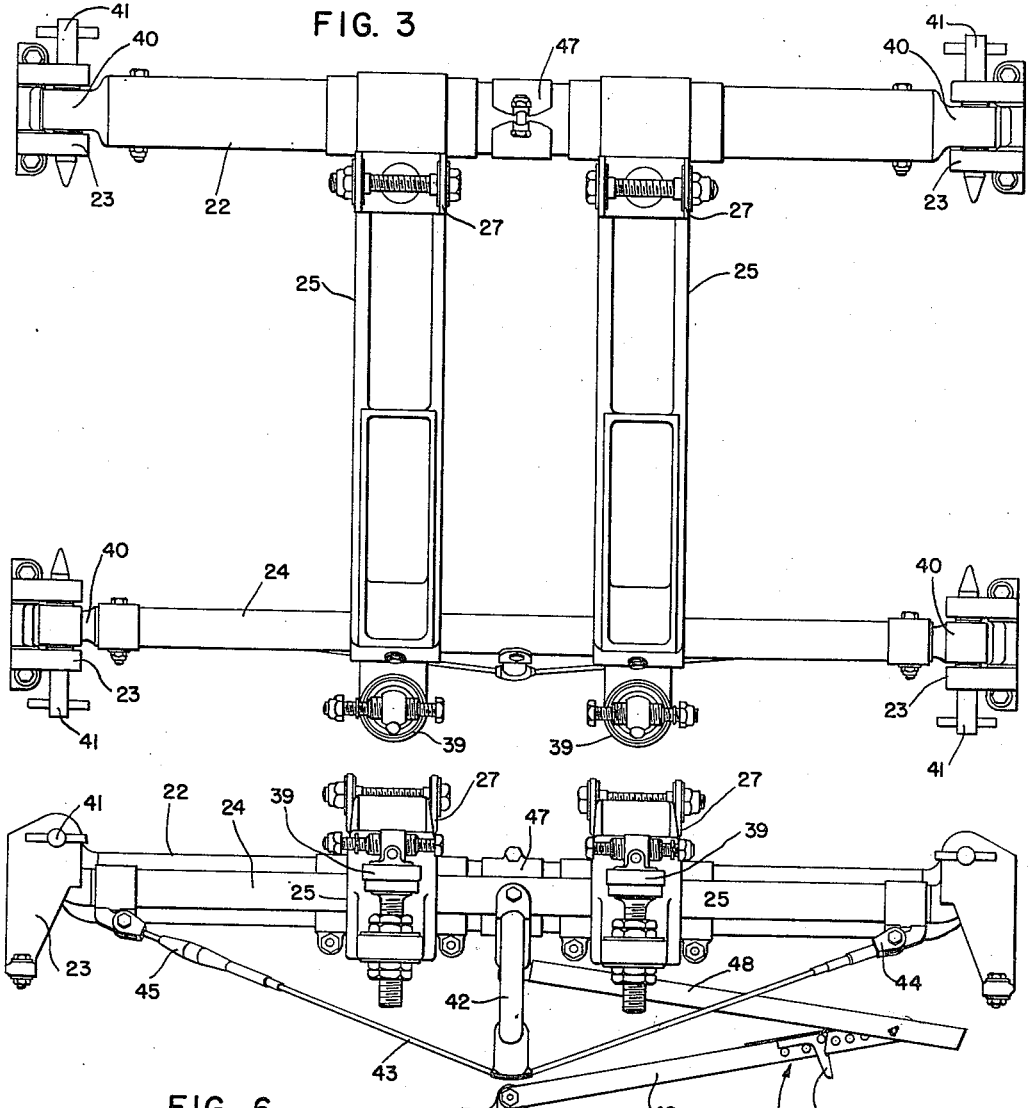
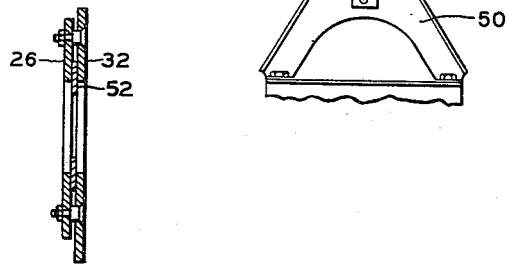
INVENTOR.
EDWARD J. MEYER
BY
*George F. Goodyear*
ATTORNEY Patented July 10, 1951

2,559,727

UNITED STATES PATENT OFFICE 2,559,727

AIRCRAFT ARMAMENT ASSEMBLY

Edward J. Meyer, Normandy, Mo., assignor to Curtiss-Wright Corporation, a corporation of Delaware Application May 21, 1945, Serial No. 594,975

12 Claims. (Cl. 89—37.5)

The present invention relates to armament installations generally and more particularly to a greatly improved arrangement and disposition of guns especially for use in connection with aircraft.

An important object of this invention resides in the provision of an armament assembly which is compact, simple to install and easily removable for servicing and repair.

An object resides in the arangement of multiple gun units for installation in aircraft such that a maximum of fire power may be concentrated in a minimum of space.

A further object is to provide a fully accessible multiple gun arrangement in which provision has been afforded for the ready removal of certain guns to facilitate service and loading operations of others of the guns.

Still a further object is to provide a swingable gun carriage and to arrange a quick detachable gun blast tube element such that a few simple manual operations will suffice to free the gun for movement to an out of the way position.

Other objects and attendant advantages flowing from this invention will be observed upon a study of the ensuing description of a preferred embodiment when taken in connection with the accompanynig drawings, in which:

Figure 2 is a fragmentary perspective view of the aircraft gun compartment in which further details are emphasized.

Figure 3 is a top plan view of the presently preferred gun carriage, the same being shown with the guns removed.

Figure 4 is an end elevation of the gun carriage of Figure 2 as seen from the rear thereof.

Figure 5 is a side view, in elevation, of the gun carriage shown in Figure 3.

Figure 6 is a detail sectional view of an accentrically movable seal shown in Figure 2.

Figure 1:
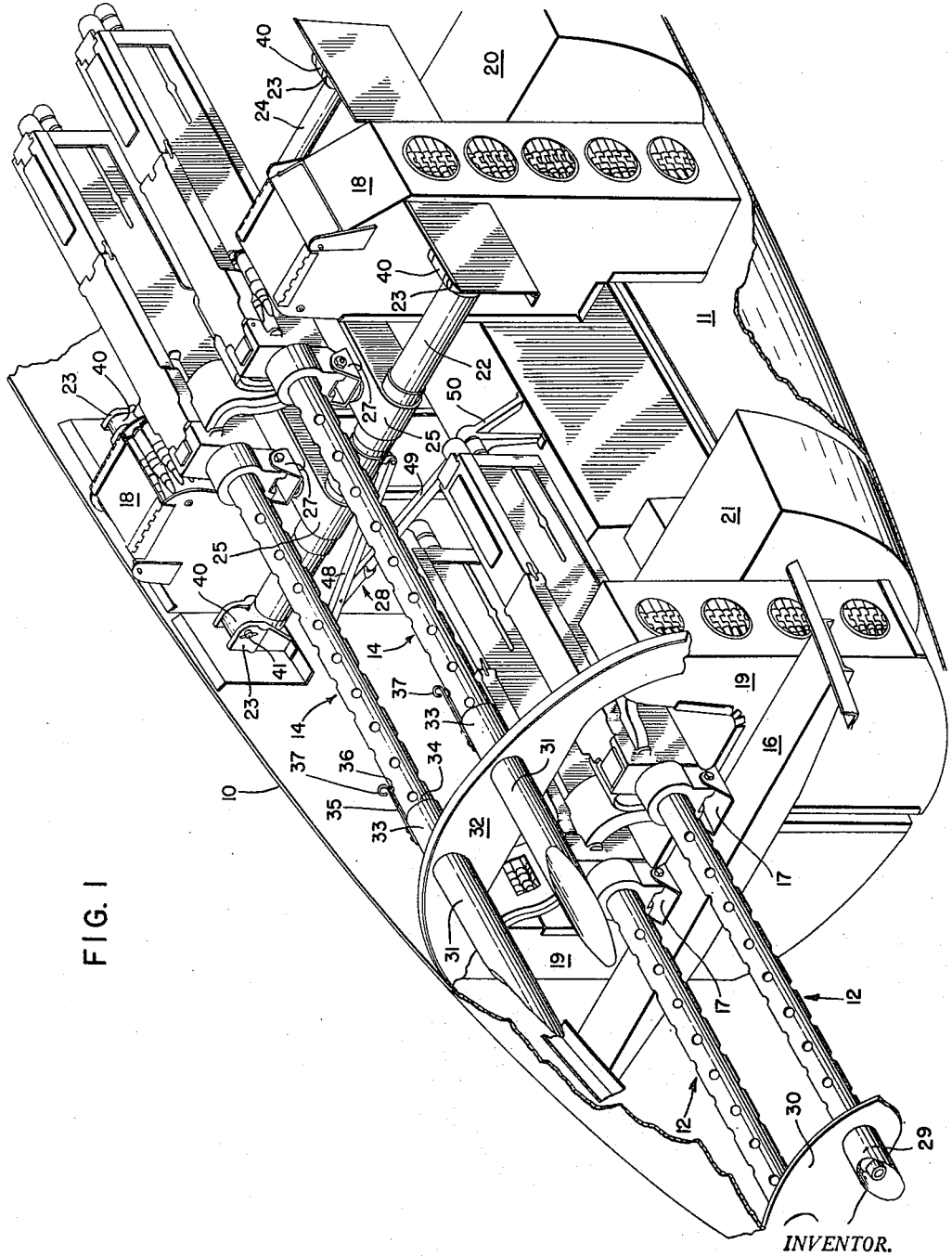
Figure 1 is a perspective view of the multiple gun units when assembled and in position in a suitable compartment provided therefor in an aircraft or the like, certain portions of the structure being broken away to reveal details of the gun assembly.

Referring now to the drawings and particularly to Figures 1 and 2 there is illustrated the assembly of the presently preferred armament installation arranged in an aircraft fuselage structure 10 and particularly within a gun compartment or space 11 provided within the fuselage as indicated. The particular arrangement includes a plurality of groups or pairs of automatic rapid fire guns 12 and 14, the group 12 being mounted or positioned in the lower portion of the compartment 11 and the group 14 being mounted or positioned above and in substantially overlapping relation with respect to the first group thereof. The guns 14, for example, may be directly above, as shown or laterally staggered with relation to guns 12. Thus it can be seen that a maximum of fire power is concentrated in a compact arrangement and that a minimum of space need be provided within the fuselage 10. Referring in particular to the lower pair of guns 12 a suitable structural supporting beam 16 is provided for forward gun mounts 17, associated one with each of the guns 12. These gun mounts 17 are each arranged for pivotal adjustment to facilitate initial gun installation and alignment. Although not shown in the present drawing, suitable provision has been made at the rear or breech end of each of these guns 12 whereby the same may be easily and quickly aligned as well as dismounted or detached. There have also been provided suitable individual ammunition cases or containers 19 for the gun units 12 respectively. In addition, a common empty shell case collection box 21 is also associated with this group of guns and is suitably arranged within the compartment 11 adjacent to and below the breech and ejector chamber for each of the guns.

Referring now to the group of guns 14 which is arranged in overlapped relation with respect to the group of guns 12 it may be seen that a hingeable gun carriage structure has been provided therefor. The carriage structure comprises a lateral extending tubular supporting element 22 which is suitably secured at each end to bracket elements 23, in turn, fixed to suitable fuselage structural members. A second tubular supporting member 24 which also extends from side to side, likewise is suitably supported in similar bracket or structural element 23 on the airplane fuselage and positioned to the rear of the carriage element 22. Cooperating with the tubular supporting members 22 and 24, there is shown a pair of identical and longitudinally disposed bridge members 25, which are adapted each to support one of the guns 14. Suitable pivotally arranged forward gun mounts or elements 27 are provided for supporting the guns on the members 25. Gun alignment and adjustment is had through adjustable and quick detachable elements later to be noted. Each of the guns 14 is supplied with ammunition from suitable supply cases 18. Empty shell cases are collected in a container or housing 20, the latter being constructed in two sections, one for each gun. While not particularly important to the present invention the means by which the rounds of ammunition are delivered to each of the groups of guns 12 and 14 shall be arranged for quick and easy installation and disassembly. Furthermore, the chutes for empty shell cases and the belt feed means or links shall also be arranged for rapid installation and detachment.

Since each of the gun units is intended to project forwardly so as to fire through apertures in the wall or surface of the fuselage 10 there has been provided a customary blast tube element 29 for each of the guns 12 of the lower set (only one being shown in Figure 1). A supporting plate or bulkhead 30 secures these fixed tubes 29 in proper position. The upper group of guns 14 are also provided with blast tube elements 31, these being supported in a suitable fuselage bulkhead or rib structure 32 and held in place by suitable flanged elements 26, as shown in Figure 2. A novel arrangement of releasable blast tube assembly is provided for each of the upper guns and comprises a sleeve element 33 which is associated with the blast tube member 31 at the forward or muzzle end 34 of each of the guns 14. Sleeve member 33 is formed to extend into the rearward portion of the fixed blast tube element 31 and have a telescoping or slip fit with the usual perforated air cooling and supporting jacket for the gun. As indicated in Figures 1 and 2 a securing member or finger element 35 is attached to each of the sleeves 33 and each is provided at its outward end with a plug element 36 which is adapted to fit into a perforation in the cooling tube for the gun. The element 35 is preferably constructed of resilient or spring material so that when the sleeve element 33 is in sealing position, the plug 36 will be pressed into and retained within the selected perforation. Release of each sleeve element 33 is obtained by manually removing the plug elements 36 from the associated perforation as by means of the finger loop 37 provided thereon. The sleeve 33 thereafter may be drawn back upon the cooling tube, one being so shown in Figure 2, to free the muzzle end of the guns 14 from its closed or sealed position with respect to the blast tubes 31. The detachable sleeve element 33 is identical for each of the guns. It should be noted here that the flange elements 26 (see Figures 2 and 6) each support an adjustable sleeve receiving disc 52 so that the sighting of each gun 14 can be made conveniently. Each of these discs 52 can be moved eccentrically within the limits of the larger aperture in its associated flange element 26. It is preferred that each disc be free floating for self alignment to prevent bending of the gun barrel or any surrounding structure. Further details of construction and arrangement of detachable blast tube sleeve elements 33 will be evident upon inspection.

Referring again briefly to the carriage structure for the guns 14, it will be observed that the tubular supporting elements 22 and 24 are provided at each end thereof with a supporting means which is in effect a hingeable connection. This hingeable connection is arranged for quick separation by the simple expedient of providing a removable pin element such that the members 22 and 24 may be released for manual displacement or movement upwardly to carry the guns 14 out of the way or to remove the same from their overlapping position with respect to the gun units 12. Hence, it may be seen that the upper guns 14 can be or are capable of being quickly and easily released from their firing position for movement to an out-of-the-way position so that servicing and loading operations may be more easily and quickly performed on the lower guns 12.

Referring now to Figures 3, 4 and 5 a more detailed showing of the swingable gun mount or carriage may be seen. The tubular member 22, which constitutes the forward transverse supporting member of the carriage for the upper guns 14, is provided at each end with a fitting element 40 which is adapted to be releasably and hingeably associated with the fixed bracket element 23 carried by the fuselage structure 10. A hinge pin or pintle element 41 of any suitable type is provided for the elements 23 and 40 to secure the same in operative position. The pintle 41 is arranged with a transverse pin or finger grip to facilitate its removal from the bracket 23 and cooperating element 40 carried on tubular member 22. A similar hingeable or detachable connection has been provided at each end of the rear tubular supporting member 24, as will be clearly observed.

The carriage bridge members 25 are disposed between the tubular members 22 and 24 and are arranged in laterally spaced relation upon each side of a center line which, in the present example, may be taken also as the center line of the fuselage structure 10. Hence symmetry of gun disposition is achieved thereby, but this is not essential for the purpose in view. As illustrated, particularly in Figure 4, the rear tubular supporting member 24 is provided with a stiffening assembly so that gun recoil may be adequately provided for. This supporting assembly comprises a centrally positioned, downwardly extending rigid post 42 and a tension cable 43, the latter being suitably attached to one end of the member 24 as at 44, and adjustably attached to the opposite end of member 24 by means of a threaded adjusting element or turnbuckle 45, so that deflection or bending of the tubular members may be limited. There is also shown, in connection with Figure 3, the means 39 herein utilized for supporting the rear or breech end of each of the gun units. While no novelty is claimed therefor, the rear supports are provided with threaded posts such that vertical adjustments may be had for initial alignment and aiming of the guns.

In order to support the swingable group of guns 14 in their out-of-the-way position, there has been provided a foldable bracing strut 28. This foldable bracing strut is associated with the forward tubular supporting member 22 and is secured thereto by means of a clamp element 47. The upper folding element 48 of this brace is pivoted on the clamp element 47 while the lower member 49 is adapted to be pivoted in a bracket 50, the latter, in turn, being attached to an internal structural part of the fuselage 10. A spring pressed snap-latch 46 serves to lock the brace in its extended position.

A particularly important advantage to be found in this installation resides in the fact that the upper guns 14 may be swung to an out-of-the-way position from either side of the fuselage structure, since a detachable bracket and hinge assembly has been provided at each side of the carriage structure (Figure 3). Furthermore, the bracing strut 28 is arranged for effective operation in either direction of swinging movement of the gun carriage. It should also be noted that, in the present arrangement, disassembly or assembly of the lower group of guns 12 is adequately provided for due to the fact that these guns are positioned in the forward zone of the compartment 11. Hence if replacement of the barrel members of the guns is required, the same may be withdrawn rearwardly to the full extent of the compartment 11. In the usual arrangement, the upper guns would, of necessity, have to be completely removed from the compartment before access to the lower guns could be effected.

The foregoing description of a preferred armament arrangement and installation is intended to teach the general principles of the invention and it should be well understood that certain alterations, modifications or other changes may be made or may become obvious after a study hereof without departing from the scope of the invention as the same is defined in the annexed claims.

What is claimed is:

1. In an aircraft having a compartment formed therein, the compartment having an access opening, a plurality of groups of guns positioned in the compartment, one group of guns being located in a position normally overlying another group of guns, the combination comprising a carriage constructed and arranged to support said one group of guns independently of said another group of guns, carriage support means on the aircraft within the compartment, said support means having separate pivot means connecting the carriage on opposite sides of said one group of guns, each of the pivot means being releasable to provide for pivotal movement of the carriage about the pivot means on the opposite side to a position in which said one group of guns is removed through said access opening from its position normally overlying said another group of guns to provide access to the latter through said opening.

2. In an aircraft having a compartment formed therein, the compartment having an access opening, a plurality of guns positioned in the compartment, at least one of said plurality of guns being located in a position normally overlying at least one other of said plurality of guns, the combination comprising means constructed and arranged to support said one gun independently of said one other gun, said means being operably mounted in the compartment for swinging movement to a position in which said one gun is removed from its normally overlying position with respect to said one other gun to provide access to the latter through said opening, and means operable upon swinging movement of said support means for retaining the same in the latter position.

3. In an aircraft having a compartment formed therein and providing a port through a wall thereof, a gun located in said compartment with the muzzle portion thereof directed toward said port, a blast tube positioned in the port for co-operation with the gun muzzle, means pivotally mounted in the compartment and constructed and arranged to support said gun, said means being pivotally movable to a position extending outwardly of the compartment, and a member slidably related with the muzzle end of the gun for movement into and from engagement with the blast tube, said member when moved from engagement with the blast tube freeing the muzzle end of the gun to provide for pivotal movement of the gun with said support means.

4. In an aircraft having a gun compartment therein, a gun mounted in the compartment and supported by the aircraft structure, a blast tube associated with the muzzle end of said gun and through which fire of the gun is directed from the compartment, a retractable blast tube sleeve telescopingly related with the muzzle end of said gun and with the blast tube, and a carriage structure for said gun arranged for swinging movement whereby said gun may be removed from its firing position upon retraction of said sleeve.

5. In combination in an aircraft having an elongated gun compartment in which a gun is arranged, a gun carriage extending transversely of the elongated gun compartment and arranged for supporting said gun in its normal firing position, means pivotally connecting said gun carriage at its opposite ends with the aircraft to provide pivotal movement of the same selectively about either of said opposite ends to a selected displaced position in which said gun is moved out of said normal position, and means for retaining said gun carriage in the selected dsplaced position.

6. In an aircraft having a gun compartment, a gun disposed therein and a swingable carriage structure for the gun, the combination therewith of a blast tube structure for the gun comprising a fixed tubular member carried in the compartment and arranged adjacent to and in advance of the muzzle of the gun, a sleeve element telescopically engaging said fixed tubular member and a member carried by the gun adjacent the muzzle end of the latter, said sleeve element being slidable telescopically upon one of said members for disengagement from the other of said members to provide for swinging of the gun with said carriage structure out of firing position, and means for releasably retaining said sleeve element in said telescopingly engaged relationship.

7. In an aircraft provided with a compartment in a portion thereof and having a gun disposed therein and a movable carriage structure for the gun to provide for movement of the latter from the compartment in a direction substantially transverse of the gun bore, the combination therewith of a blast tube structure for the gun comprising a fixed tubular member carried by the compartment structure and disposed adjacent to and in advance of the muzzle of the gun, a sleeve element for telescoping engagement with the fixed member and in telescopically slidable relation to the gun muzzle for slidable movement into disengagement from said fixed member, and resilient means for releasably retaining the sleeve element in telescoping engagement with said fixed member.

8. In an aircraft having a compartment formed therein with an access opening, two groups of guns in said compartment with one group overlying the other, the compartment having a wall adjacent the muzzle ends of the guns of said one group, and a blast tube on said wall for each gun of said one group substantially aligned with the line of fire thereof, the combination comprising a retractable blast tube sleeve telescopically related with the muzzle of each gun of said one group and with the associated blast tube, a carriage supporting the guns of said one group, and a releasable hinge connection between the carriage and the aircraft adjacent each side of the compartment with the axes of said hinge connections being substantially parallel to said lines of fire, whereby said carriage and the guns supported thereby may be swung about either hinge axis to provide access to the underlying group of guns upon retraction of said sleeves and release of the other pivot connection.

9. In an aircraft having a compartment formed therein with an access opening, two groups of guns in said compartment with one group overlying the other, the combination comprising a carriage supporting the guns of the overlying group, a releasable hinge connection between the carriage and the aircraft adjacent each side of the compartment with the axes of said hinge connections substantially parallel to said lines of fire, whereby said carriage and the guns carried thereby may be swung about either hinge axis to a displaced position to provide access to the underlying group of guns upon release of the other pivot connection, and a collapsible strut pivoted to the aircraft and to said carriage and arranged for extension by and upon movement of the carriage to said displaced position for supporting the latter in such position.

10. In an aircraft having a gun compartment, a carriage supporting the gun, means adjacent each side of said compartment pivotally connecting the carriage to the aircraft, the pivot axis of each of said means being generally parallel to the line of fire of the gun, and releasable means for holding the carriage against movement around said pivot axes, the carriage being selectively movable about either one of said axes to effect bodily displacement of the gun upon release of said releasable means.

11. In an aircraft having a gun compartment therein, a gun in the compartment, a blast tube fixedly mounted on said structure and having its axis aligned with the gun bore when the latter is in firing position to provide for fire from the compartment, a carriage supported by said structure and mounting said gun in said firing position, means pivotally connecting said carriage structure with the aircraft to provide for pivoting movement of the carriage and gun about an axis substantially parallel to said axis to a displaced position, and a brace arranged to support said carriage and the gun mounted thereon in said displaced position.

12. In an aircraft having a compartment formed therein, the compartment having an access opening, a plurality of groups of guns positioned in the compartment, one group being located in a position normally closer to said opening than the other group, a carriage in said compartment remote from said opening including means for releasably holding the individual guns of the group remote from the opening, a carriage in said compartment relatively closer to said opening including means for releasably holding the individual guns of the closer group, support means on the aircraft within said compartment including individually releasable pivotal means on opposite sides of said guns to enable bodily removal of the closer group with its carriage to provide access to the remote group, when both said pivotal means are released, said closer group, with its carriage, being swingable about one said pivotal means when the other pivotal means is released.

EDWARD J. MEYER.

REFERENCES CITED

The following references are of record in the file of this patent:

UNITED STATES PATENTS

| Number | Name | Date |
|---|---|---|
| 1,385,755 | Roche | July 26, 1921 |
| 1,847,237 | Emery, Jr. | Mar. 1, 1932 |
| 2,271,700 | Martin | Feb. 3, 1942 |
| 2,331,033 | La Porte | Oct. 5, 1943 |
| 2,346,809 | Woods | Apr. 18, 1944 |
| 2,372,728 | Martin | Apr. 3, 1945 |
| 2,384,430 | Beardslee | Sept. 11, 1945 |
| 2,385,024 | Palfrey | Sept. 18, 1945 |

FOREIGN PATENTS

| Number | Name | Date |
|---|---|---|
| 318,906 | Italy | June 23, 1934 |
| 773,010 | France | Nov. 10, 1934 |
| 839,982 | France | Apr. 17, 1939 |
| 859,520 | France | June 10, 1940 |
| 541,265 | Great Britain | Nov. 20, 1941 |

OTHER REFERENCES

"Air Trails," January 1943, frontispage.
"Flight," May 6, 1943, pp. 472a; 472b.
Pages 44, 45, 146 and 148, "Aviation" magazine, May 1941, vol. 40, No. 5.